3,378,751
CURRENT LIMIT CIRCUIT FOR AN INVERTER UTLIZING A MASTER AND A SLAVE MULTI-VIBRATOR
Loren H. Walker, Waynesboro, Va., assignor, by mesne assignments, to the United States of America as represented by the Secretary of the Navy
Filed Dec. 14, 1964, Ser. No. 418,032
5 Claims. (Cl. 321—14)

ABSTRACT OF THE DISCLOSURE

A current limit circuit for an inverter wherein the inverter utilizes a master multivibrator to trigger a slave multivibrator. The phase of the slave multivibrator relative to the master multivibrator determines the magnitude of the output current and is controlled by a magnetic amplifier. The output current is sensed and compared to a maximum reference, whereby if the output current exceeds the maximum reference, the magnetic amplifier is effectively short circuited, thereby controlling the relative phase of the master and slave multivibrators to reduce the current output.

---

The invention relates to a current limit circuit, and particularly to a current limit circuit for an inverter that uses multivibrators.

Static inverters are used to change direct current to alternating current. One type of static inverter uses a master multivibrator which switches at a predetermined rate and a slave multibrator which is coupled to and switched by the master multivibrator. The time at which the slave multivibrator is switched determines the width of the square wave produced by the inverter, and this width determines the voltage amplitude of the output alternating current after it is filtered. If the inverter is overloaded beyond a predetermined magnitude, it is desirable that the output voltage be reduced to zero so as to protect the elements in the inverter.

Accordingly, an object of the invention is to provide a current limit circuit that quickly reduces the output voltage of an inverter to zero when the output current exceeds a predetermined magnitude.

In cases where the inverter overload may disappear of its own accord, it is desirable that the output voltage be maintained as near rated voltage as possible and be restored to rated voltage as quickly as possible so as to keep the loads supplied with power.

Accordingly, another object of the invention is to provide a current limit circuit that permits the output current of an inverter to rise to a predetermined magnitude during every half cycle.

Another object of the invention is to provide a current limit circuit that permits the output current of an inverter that uses multivibrators to rise to a predetermined magnitude during every half cycle before reducing the output voltage to zero when the output current exceeds that predetermined magnitude.

Briefly, these and other objects are achieved in accordance with the invention by a circuit that senses the magnitude of output alternating current produced by master and slave multivibrators. This circuit compares the sensed current magnitude with a reference magnitude and produces a limit signal at and during the time that the sensed current magnitude exceeds the reference magnitude. This limit signal is coupled to the slave multivibrator for causing the slave multivibrator to switch in response to each limit signal so produced. By causing the slave multivibrator to so switch, the output voltage of the inverter is reduced to zero, but the inverter is capable of operating normally on the next half cycle.

Figure 1:
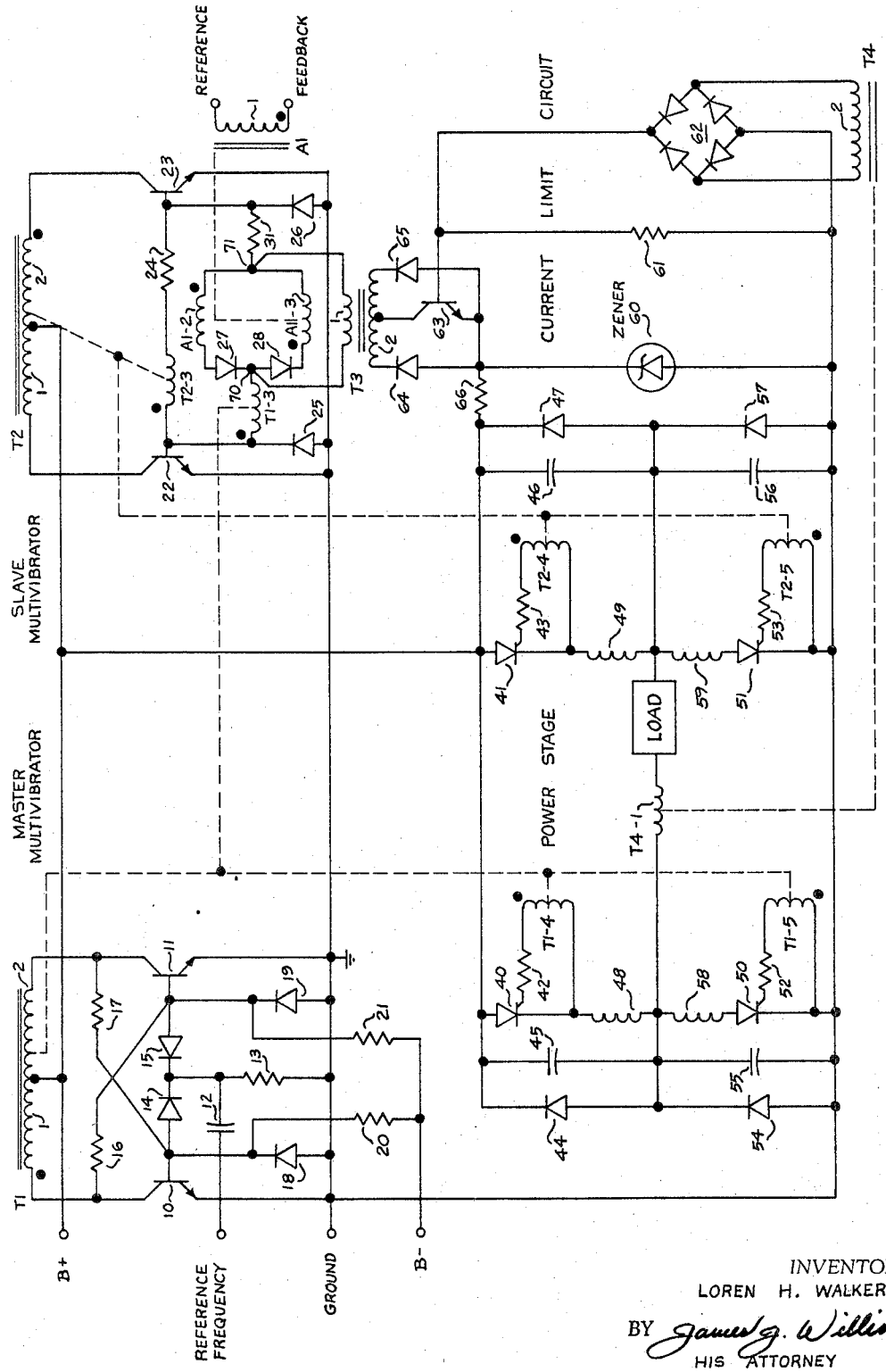
Figure 2:
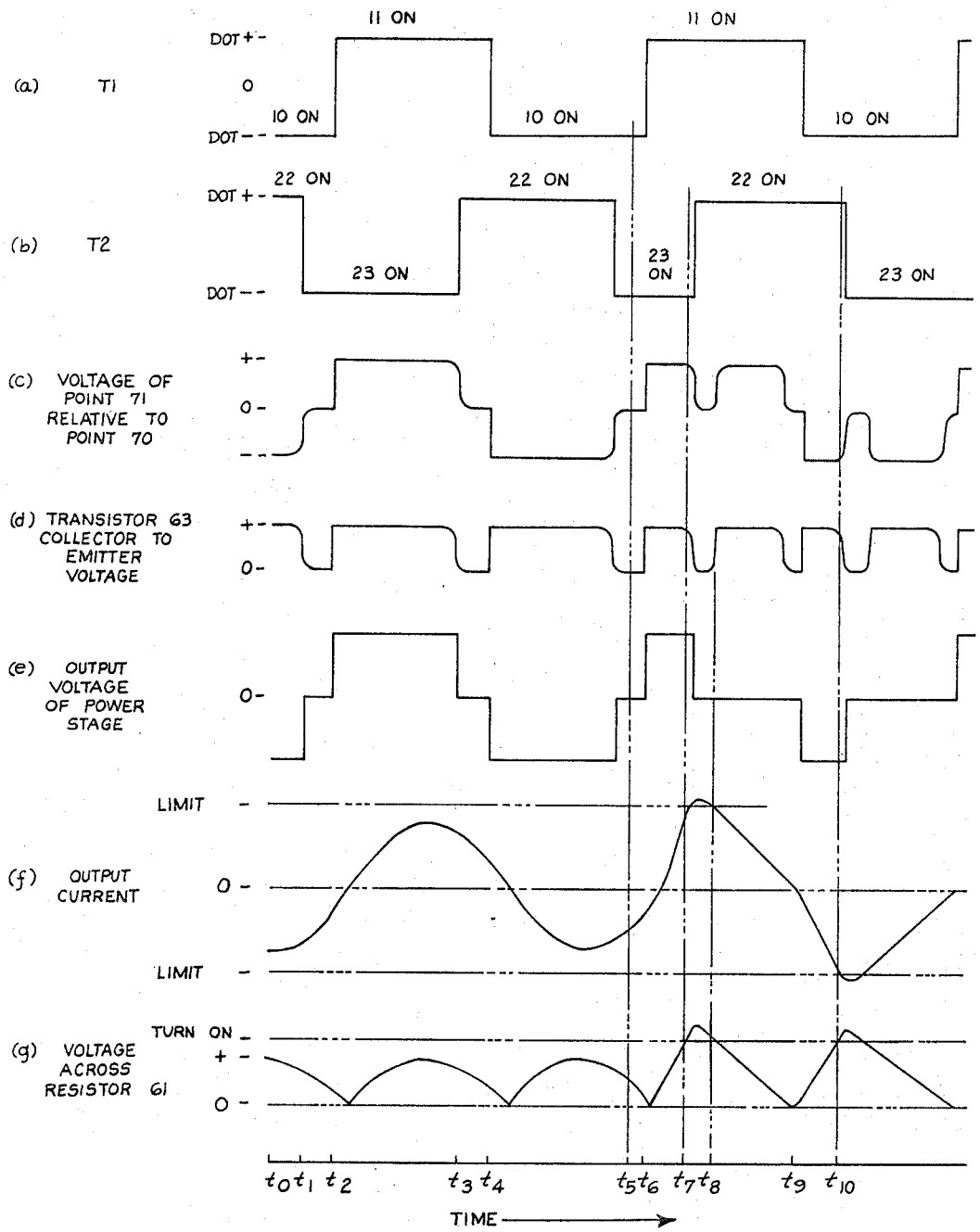

The invention is particularly pointed out in the claims. The invention may be better understood from the following description given in connection with the accompanying drawing, in which:

FIGURE 1 shows a diagram of the current limit circuit of the invention as used with an inverter; and FIGURE 2 shows waveforms for explaining the operation of the inverter and the current limit circuit of the invention.

The inverter shown in FIGURE 1 is known in the art, and comprises a master multivibrator, a slave multivibrator, and may, if desired, also comprise a power stage. The transformers in FIGURE 1 are indicated by the letter T followed by a number indicating the transformer number, and this is followed by a hyphen and number indicating the winding number of the transformer. The magnetic amplifier in FIGURE 1 is indicated by the letter A followed by a number indicating the amplifier number, and this is followed by a hyphen and a number indicating the winding number of the amplifier. The windings which are coupled together are so indicated by dashed lines. Thus, the transformer T1 comprises five windings, the first and second windings being in the master multivibrator, the third winding being in the slave multivibrator, and the fourth and fifth windings being in the power stage. Also in FIGURE 1, each of the windings is provided with the conventional dot polarity. In accordance with this convention, a voltage polarity applied to the dotted end of a given winding causes the same polarity to appear at all dotted ends of all windings associated with that given winding.

In FIGURE 1, it has been assumed that the system is intended to produce 400 cycle alternating current from direct current supplied between a B+ terminal and a ground bus. The master multivibrator is supplied with a reference frequency which, for the assumed example, may be negative-going pulses at an 800 cycle rate. These pulses are applied through a capacitor 12 and through diode rectifiers 14, 15 to the respective bases of NPN type transistors 10, 11. The transistors 10, 11 are connected in conventional bistable multivibrator fashion with resistors 16, 17 intercoupling their bases and collectors. The collectors of the transistors 10, 11 are respectively coupled to opposite ends of windings T1–1, T1–2, and these windings T1–1, T1–2 are connected to the B+ terminal at their point of connection. The bases of the transistors 10, 11 are respectively coupled through diode rectifiers 18, 19 to the ground bus, and are also respectively coupled through resistors 20, 21 to a source of direct current potential B— that is negative with respect to the ground bus. A resistor 13 is also coupled between the capacitor 12 and the ground bus. The emitters are coupled to the ground bus. The master multivibrator is arranged so that when a negative-going pulse is applied, the transistor that is conducting is cut off and the current flow through the associated winding T1–1 or T1–2 causes the collector voltage of the conducting transistor to increase. This increased voltage is coupled through one of the resistors 16, 17 to cause the other transistor to be turned on.

The slave multivibrator also comprises two NPN type transistors 22, 23 which have their collectors coupled to opposite ends of windings T2–1, T2–2. These windings T2–1, T2–2 are connected to the B+ terminal at their point of connection. The bases of the transistors 22, 23 are coupled together through a winding T2–3 and a resistor 24, and also through a winding T1–3, the parallel circuit comprising diode rectifiers 27, 28 and windings A1–2, A1–3, and a resistor 31. The slave multivibrator is switched from one condition with one transistor conducting to the other condition with the other transistor conducting by the winding T1–3 which is coupled to the transformer T1 in the master multivibrator. For example, if the transistor 11 in the master multivibrator is conducting, current is flowing from the dotted end to the undotted end of winding T1–2. The dotted end of the winding T1–3 is therefore positive and this causes current to flow from this dotted end through the base-emitter path of the transistor 22, the diode rectifier 26, the resistor 31, the winding A1–2, and the diode rectifier 27 back to the undotted end. Normally, this current is, at first, limited to some exciting current because of the previously reset condition of the magnetic amplifier A1. The exciting current continues to flow as long as the magnetic amplifier A1 is reset. When the amplifier A1 becomes saturated in the set condition, sufficient current may then flow around the path described to cause the transistor 22 to conduct. When the transistor 22 conducts, current flows from the dotted end toward the undotted end of the winding T2–1, and this provides regenerative or reinforcing action through the winding T2–3. Thus, the transistor 22 is quickly turned on and the transistor 23 is quickly turned off after some predetermined time determined by the degree of reset of the amplifier A1. When another negative-going pulse is applied to the master multivibrator to turn the transistor 11 off and the transistor 10 on, the transformer T1 reverses and current flows from the undotted end toward the dotted end of the winding T1–1. Subsequently, the transistor 23 is turned on by a current which flows from the undotted end of the winding T1–3 through the diode rectifier 28, the winding A1–3, the resistor 31, the base-emitter path of the transistor 23, and the diode rectifier 25 back to the dotted end of the winding T1–3. This also turns the transistor 22 off.

An output from the master and slave multivibrators may be derived directly through additional windings coupled to the transformers T1, T2. Or, the output may be amplified in the power stage shown in FIGURE 1. The power stage is supplied with power between the B+ terminal and the ground bus, and is applied to the load through controlled rectifiers 40, 41, 50, 51. These controlled rectifiers are switched on or turned on by appropriate currents from respective gate windings T1–4, T2–4, T1–5, T2–5 coupled in series with resistors 42, 43, 52, 53 between the respective gate electrodes and cathodes. The controlled rectifiers 40, 41, 50, 51 are respectively provided with commutating circuit elements including diodes 44, 47, 54, 57, capacitors 45, 46, 55, 56, and inductors 48, 49, 58, 59. The gate windings are coupled to the master and slave multivibrator transformers T1, T2 so that rectifiers 40, 51 conduct and supply one half cycle of power to the load, followed by rectifiers 50, 51 conducting and supplying no power, followed by rectifiers 41, 50 conducting and supplying a second half cycle of power to the load, followed by rectifiers 40, 41 conducting and supplying no power, and then followed by rectifiers 40, 51 conducting to repeat the cycle.

The magnetic amplifier A1 is reset by an amount determined by the relative magnitudes of a reference voltage and a feedback voltage which are applied to opposite ends of the amplifier winding A1–1. As the feedback voltage (which is indicative of the inverter output voltage) approaches the reference voltage in magnitude, the amplifier A1 is reset less. The inverter produces less output voltage amplitude for this condition. As the feedback voltage becomes less than the reference voltage, the inverter produces more output voltage amplitude.

The part of FIGURE 1 described thus far is known in the art. In the current limit circuit of the invention, current supplied by the inverted to the load is sensed by any suitable means, such as a current transformer T4 which has its primary winding T4–1 in series with the load. The secondary winding T4–2 is coupled to a full wave bridge rectifier 62. The rectified output is applied across a resistor 61. The positive terminal of the resistor 61 is coupled to the base of an NPN type transistor 63. The emitter of the transistor 63 is coupled to a reference voltage supplied by a voltage dropping resistor 66 and a voltage reference or Zener diode 60. Thus, the transistor 63 can be turned on when the current in the load, as indicated by the voltage supplied to the base by the bridge rectifier 62, exceeds the reference voltage on the emitter of the transistor 63. The collector of the transistor 63 is coupled to the center tap of a secondary winding T3–2 of the transformer T3. The ends of the winding T3–2 are respectively coupled to rectifiers 64, 65 which are coupled to the emitter of the transistor 63. The primary winding T3–1 of the transformer T3 is coupled across or in shunt with the magnetic amplifier A1 at the points 70, 71. When the transistor 63 is rendered conductive, its current is reflected into the winding T3–1 so that a large current can flow through this winding T3–1 and shunt or bypass the magnetic amplifier A1. Thus, the volt-second time delay normally introduced by the magnetic amplifier windings A1–2, A1–3 can be reduced to zero so that the slave multivibrator switches immediately or very shortly after the master multivibrator switches. As will be pointed out, this reduces the output voltage of the power stage so as to limit the output current.

The operation of the circuit of FIGURE 1, particularly the current limit circuit of the invention, will be explained in connection with the waveform shown in FIGURE 2. These waveforms show various voltages in the circuit plotted against a common time axis. The waveforms in FIGURES 2a and 2b show when the dotted ends of the windings of the transformers T1, T2 are respectively positive and negative. Initially, it has been assumed that the transistors 10, 22 are conducting at the time $t_0$. The dotted ends of the windings of the transformer T1 are negative, and the dotted ends of the windings of the transformer T2 are positive. With the dotted end of the winding T1–3 in the slave multivibrator negative, current flows from the undotted end of the winding T1–3 through the rectifier 28, the winding A1–3, the resistor 31, the base-emitter path of the transistor 23, and the diode rectifier 25 back to the dotted end. At a time $t_1$, this time being dependent on the degree to which the magnetic amplifier A1 has been reset, this current will saturate the magnetic amplifier A1 in the set direction. The voltage between points 70, 71 becomes substantially zero as shown in FIGURE 2c, if diode and transistor voltage drops are ignored. This permits sufficient current to flow to cause the transistor 23 to conduct. Thus as shown in FIGURE 2b at the time $t_1$, the transformer T2 reverses, the transistor 22 is turned off, and the transistor 23 is turned on. In the power stage, the rectifiers 50, 51 are turned on and the output voltage falls to zero as shown in FIGURE 2e.

At the time $t_2$, the master multivibrator is switched so that transistor 11 is turned on and transistor 10 is turned off. With the transistors 11, 23 turned on, the rectifiers 40, 51 are turned on and current may flow through the load from left to right as viewed in FIGURE 1. Thus, the output voltage in the power stage rises to the value shown in FIGURE 2e at the time $t_2$. In FIGURE 2c at the time $t_2$, the point 71 is positive with respect to the point 70 because the magnetic amplifier A1 is reset to some degree and the dotted ends of the windings of the transformer T1 are positive. FIGURE 2d shows the voltage between the collector and emitter of the transistor 63. This voltage is derived through the transformer T3 and its primary winding T3–1 coupled between the points 70, 71. When a voltage exists between the points 70, 71, the collector of the transistor 63 is always positive with respect to the emitter (because of the full wave rectification). When the voltage between points 70, 71 is zero, then the collector and emitter are at the same voltage.

The output current through the load may be filtered by suitable circuits which may be assumed to be in the load. Thus, the output current shown in FIGURE 2f is sinusoidal. In FIGURE 2f, it has been assumed that the load is inductive so that the output current passes through zero and maximum values with a slight time delay relative to the output voltage of the power stage. This output current, after being sensed by the transformer T4 and rectified by the full wave rectifier 62 produces the full wave rectified voltage across the resistor 61 as shown in FIGURE 2g.

At the time $t_3$, the magnetic amplifier A1 saturates in the set direction, so that the voltage between the points 70, 71 falls subsantially to zero as shown in FIGURE 2c. This causes the slave multivibrator to switch so that the transistor 23 is turned off and the transistor 22 is turned on. The dotted ends of the windings of transformer T1 are positive and the dotted ends of the windings of transformer T2 are also positive. The rectifiers 40, 41 are turned on so that the output voltage falls to zero. But at the time $t_4$ the master multivibrator switches so that transistor 11 is turned off. The rectifiers 50, 41 are turned on and the output voltage of the power stage then rises to the value shown in FIGURE 2e at the time $t_4$.

In the absence of any current overload, the circuit would continue operating as described. However, assume that at the time $t_5$, an overload current is applied. Since at the time $t_5$ the output current is going from a negative value toward zero, no limiting is called for. Therefore, the circuit continues in its operation with the master multivibrator switching at the time $t_6$ so that the transistor 11 is turned on and the transistor 10 is turned off. The output voltage increases to its maximum value as shown in FIGURE 2e at the time $t_6$, and the output current follows. Because of the overload, the output current exceeds the predetermined and indicated limit at the time $t_7$. When this occurs, the transistor 63 is turned on because the voltage at its base (provided by the resistor 61, as indicated in FIGURE 2g) is sufficiently positive with respect to the voltage on its emitter. When the transistor 63 is on, a limit signal is provided. As shown in FIGURE 2d, the collector-to-emiter voltage of the transistor 63 drops to zero. In this case, the transistor 63 is drawing current from the winding T3–1. This current, in effect, short circuits the magnetic amplifier A1 between the points 70, 71 so that the voltage between these points 70, 71 falls to zero as shown in FIGURE 2c. With zero voltage between the points 70, 71, the slave multivibrator is switched so that the transistor 23 is turned off prematurely, and transistor 22 is turned on prematurely. The effect of this is to have transistor 11 in the master multivibrator turned on and the transistor 22 in the slave multivibrator turned on so that the rectifiers 40, 41 are conducting. Under this condition, the output voltage of the power stage falls to zero as shown in FIGURE 2e shortly after the time $t_7$.

With the output voltage of the power stage at zero, the output current begins to fall. As shown in FIGURE 2f, this current falls below its predetermined limit at the time $t_8$. Likewise, the voltage across the resistor 61, shown in FIGURE 2g, falls below the required turn-on value for the transistor 63. The current continues to fall or decay as shown in FIGURES 2f and 2g between the times $t_8$ and $t_9$. At the time $t_9$, the master multivibrator switches again so that the transistor 11 is turned off and the transistor 10 is turned on. Under these conditions, the rectifier 41, 50 are conducting so that the output voltage increases again but in the opposite direction as shown in FIGURE 2e. The output current begins to increase in the same opposite direction. If the overload condition still exists, the output current exceeds its limit in the opposite direction at the time $t_{10}$ as shown in FIGURE 2f. At the same time, the voltage across the resistor 61 reaches the requisite turn-on value so that the transistor 63 conducts. The voltage between points 70, 71 falls to zero again, and this causes the slave multivibrator to switch prematurely again as indicated in FIGURE 2b shortly after the time $t_{10}$. Thus, the output voltage of the power stage decreases to zero again. Likewise, the output current begins to fall toward zero. This operation continues until the fault is removed, after which normal operation as shown between the times $t_0$ and $t_5$ is resumed.

It will thus be seen that the current limit circuit of the invention provides a circuit which operates quickly with a magnetic amplifier to limit the current to any predetermined value. This current is determined by the various circuit components, but may be easily set by the value of the resistor 61. Thus, it may be desirable that the resistor 61 be variable. And, it will be seen that the current limit circuit restores itself as soon as the excess current falls below the predetermined limit value so that normal operation may resume if the overload is removed during any part of a cycle. The current limit circuit of the invention is particularly desirable since it attempts to resume normal operation after each half cycle of excessive current, and does not require some external resetting or restoring means. Further, the current limit circuit operates with already existing magnetic amplifier circuits, thus lending itself to static inverters using magnetic amplifiers.

Various modifications of the invention will occur to persons skilled in the art. For example, the current sensing circuit may take other forms besides the current transformer. And, the current sensing circuit may be provided at any appropriate point in the output, depending on the various circuits being used. The current limit circuit may be used in a multiphase system using inverters. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A current limit circuit for an inverter that produces alternating current for a load, said inverter having a master bistable circuit and a slave bistable circuit coupled to and switched by said master bistable circuit through a volt-second magnetic coupling, to control the phase of said slave bistable circuit relative to said master bistable circuit comprising sensing means coupled to said inverter for sensing the magnitude of said alternating current of said inverter; reference means for producing a reference voltage; third means coupled to said sensing means and said reference means for producing a limit signal during the time said sensed alternating current exceeds a limit current of which said reference voltage is representative for providing an effective short circuit across said magnetic coupling in response to the presence of said limit signal and for removing said short circuit in the absence of said limit signal, said third means comprising a transformer having its primary coil shunting said magnetic coupling, said transformer having a secondary coil, a transistor connected across said secondary coil to provide a load for said secondary coil, said transistor being gated by said sensing means and said reference means whenever said alternating current exceeds said limit current to effectively short circuit said magnetic coupling through said secondary coil.

2. A current limit circuit as recited in claim 1 wherein said transistor is a semiconductor device with two P–N junctions.

3. A current limit circuit as recited in claim 1 wherein said reference means comprises a Zener diode and a resistor connected in series, the reference voltage being obtained at the cathode of said Zener diode.

4. A current limit circuit as recited in claim 1 wherein a rectifier is provided in the circuit of said transistor and said secondary coil to provide said transistor with a rectified DC input.

5. A current limit circuit as recited in claim 1 wherein said sensing means comprises a transformer having its primary coil in series with said load, said transformer also having a secondary coil, a rectifier shunting said secondary coil, and a resistor connected across the output of said rectifier.

References Cited

UNITED STATES PATENTS

| | | | |
|---|---|---|---|
| 2,955,247 | 10/1960 | Moyer et al. | 321—25 X |
| 3,031,629 | 4/1962 | Kadii | 331—52 X |
| 3,205,424 | 9/1965 | Bates | 331—113.1 X |
| 3,311,807 | 3/1967 | Rodaer | 321—45 X |
| 3,317,812 | 5/1967 | Mesenhimer | 321—16 |

JOHN F. COUCH, *Primary Examiner.*

WILLIAM SHOOP, *Assistant Examiner.*